United States Patent [19]

Butler et al.

[11] 4,040,449

[45] Aug. 9, 1977

[54] OIL-TIGHT LAY-IN DUCT

[75] Inventors: DeForest D. Butler; Andy Mancik, both of Oxford, Ohio

[73] Assignee: Square D Company, Park Ridge, Ill.

[21] Appl. No.: 443,056

[22] Filed: Feb. 15, 1974

[51] Int. Cl.$^2$ .................. H02G 3/04; H02G 3/06
[52] U.S. Cl. ..................... 138/92; 138/155; 138/163; 138/164; 174/68 C; 174/101; 285/121; 285/363; 285/424
[58] Field of Search ............... 138/155, 163, 164, 158, 138/92; 174/68 C, 101, 35 GC; 403/337; 285/121, 363, 424

[56] References Cited

U.S. PATENT DOCUMENTS

| | | | |
|---|---|---|---|
| 3,003,794 | 10/1961 | Burley | 174/68 C |
| 3,357,722 | 10/1965 | Howard | 285/424 X |
| 3,562,402 | 2/1971 | Dwyer | 174/101 X |
| 3,570,546 | 3/1971 | Jackson | 174/101 X |
| 3,636,984 | 1/1972 | Rauhauser | 174/101 |

Primary Examiner—Richard E. Aegerter
Assistant Examiner—James E. Bryant, III
Attorney, Agent, or Firm—Ernest S. Kettelson; Michael J. Femal; Richard T. Guttman

[57] ABSTRACT

Lengths of lay-in ducts, each in the form of an open top trough having exterior connecting flanges at its ends, are connected together in end to end relation in a run by bolts passed through the flanges. Each trough is provided with a cover which terminates a slight distance short of the trough ends. A joint sealing device common to the adjacent end portions of two connected troughs provides a seal between the device itself and the tops of the adjacent end portions of the trough, between the end portions of the covers and their associated troughs, and between the adjacent end portions of the covers themselves. The device extends across the troughs, and has one end hingedly connected to a supporting bracket which, in turn, is clamped fixedly in position on one of the connected trough flanges by one of the connecting bolts connecting the flanges together. The bracket supports the joint sealing device for swinging toward the troughs to closed or operating position in which it effects its sealing relations, and away from the troughs to open or inoperative position. The joint sealing device, in the operative position is effective to prevent the entry of oil and coolant spray and drip in installations in which the duct joint is near to machine tools and the like.

8 Claims, 4 Drawing Figures

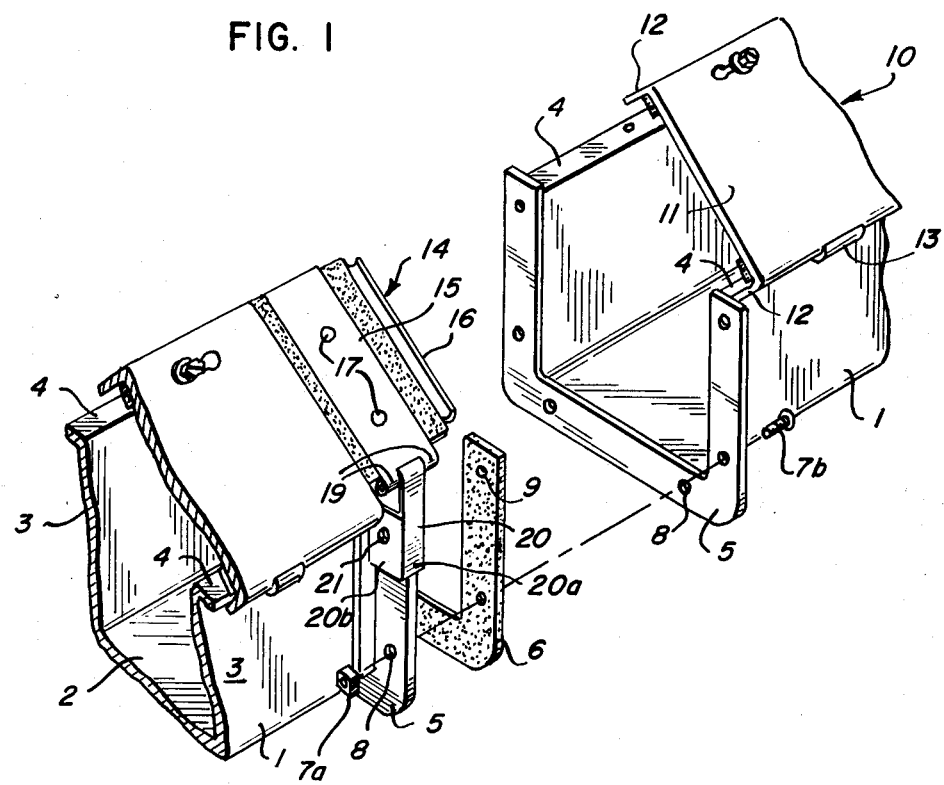
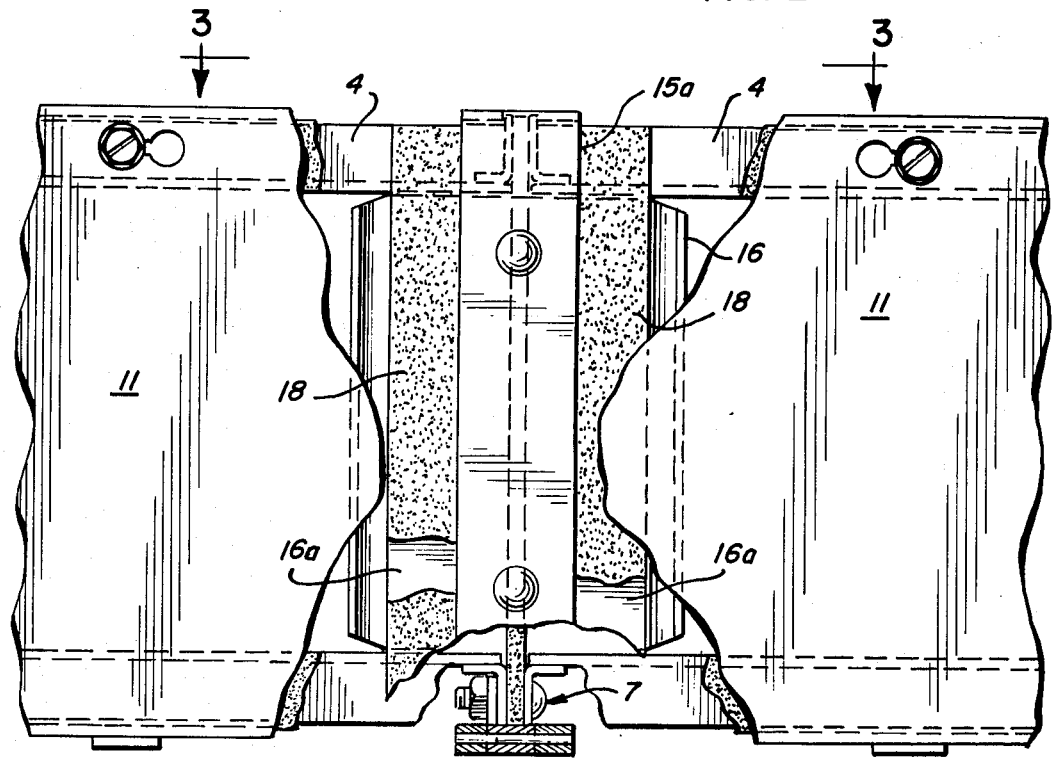

OIL-TIGHT LAY-IN DUCT

BACKGROUND OF INVENTION

1. Field of Invention

Lay-in ducts for electrical wiring.

2. Description of the Prior Art

Heretofore lay-in ducts have been provided in which a plurality of lengths of open top troughs with hinged covers are joined together in end to end relation. Generally, the two adjacent ends are connected by means of a connector strap which is of U-shaped formation so as to lie within the adjacent ends of troughs connected thereby. The connector is provided with means for bolting it to the ends of the two troughs so as to hold them in the end to end relation. Generally the strap is provided with a hinged top arm which extends across the ducts at the open top and to which the covers are bolted. Also, it is known in the art to provide troughs with external flanges at their ends and connected together by suitable bolts passed through the flanges.

These prior connections do not provide seals between the end of each cover and its supporting trough or between the adjacent ends of two adjacent covers.

SUMMARY

In accordance with the present invention adjacent ends of adjacent troughs are connected together by bolts received through holes in their external flanges and which draw the flanges tightly into face to face sealing relation to a sealing gasket therebetween. The gasket extends from the top of one side wall of each trough along the side wall, to and around the base, and on to the top of the other side wall of the trough. The joint sealing device provides a seal between the covers of the troughs at the ends adjacent their junctures, and between each cover at its end and its associated trough. The joint sealing device is supported so that it can be swung to open or inoperative position and to closed or operative positions by a supporting bracket held fixedly in position against one of the connecting flanges of the troughs by the flange connecting bolts.

The principal object is to provide lay-in duct joints which are sealed to exclude oil and coolant spray and drip from the interior of the duct so that the joints can be located safely near machinery and other equipment.

Various other objects and advantages will become apparent from the following description wherein reference is made to the drawing.

BRIEF DESCRIPTION OF THE DRAWINGS

FIG. 1 is an exploded fragmentary prespective view of two adjacent lengths of lay-in troughs with their covers and the sealing joint of the present invention shown in connection therewith;

FIG. 2 is an enlarged fragmentary top plan view of the structure illustrated in FIG. 1;

Figure 3:
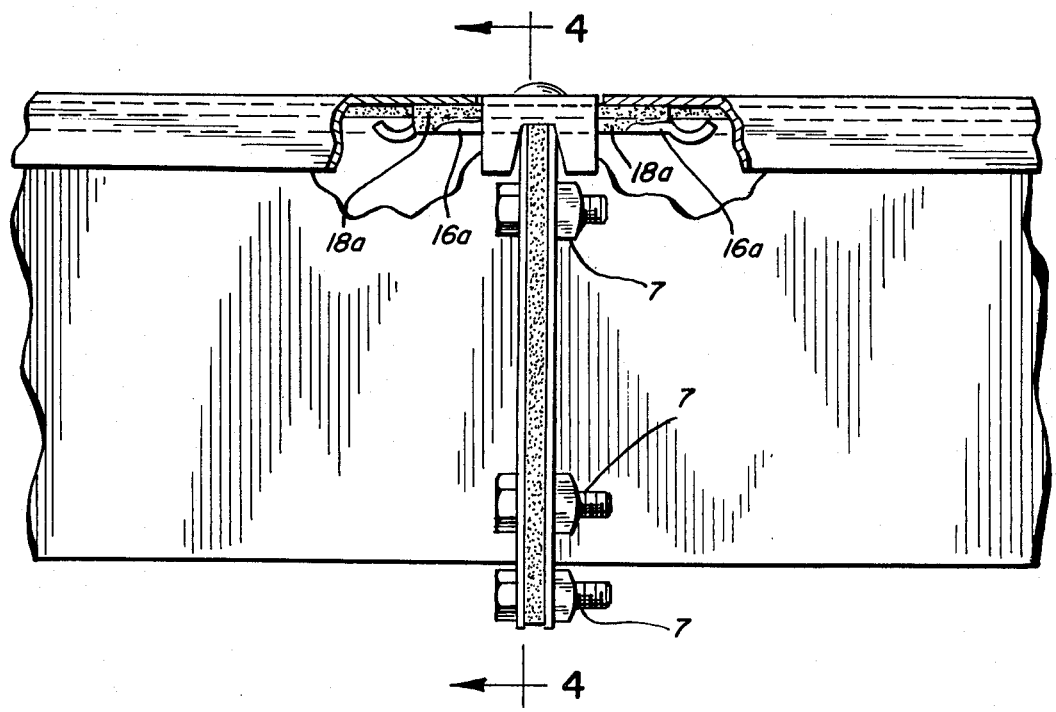
FIG. 3 is a fragmentary rear elevation of the structure illustrated in FIG. 2, viewed as indicated by the line 3—3 in FIG. 2, portions thereof being broken away for clearness in illustration.
Figure 4:
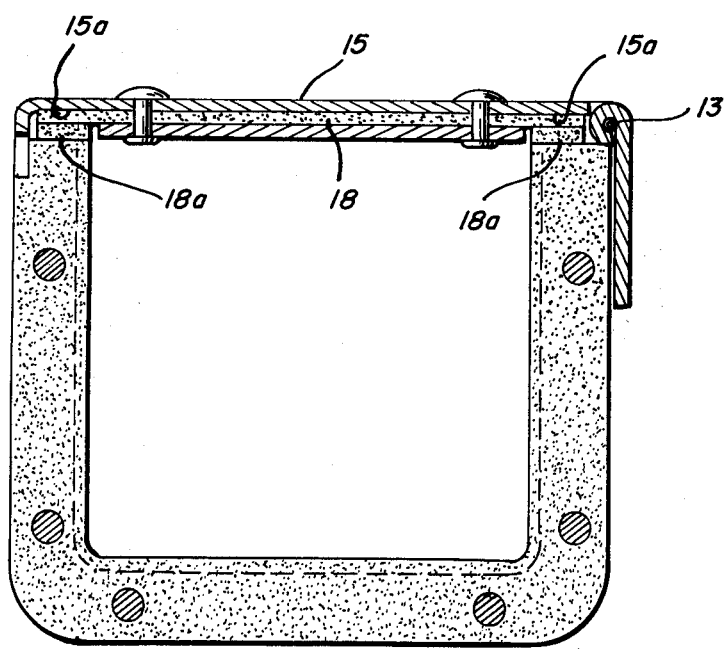
FIG. 4 is a vertical cross sectional view taken on the line 4—4 in FIG. 3.

Referring to the drawings, the lay-in duct of the present invention comprises a plurality of identical lengths of open top troughs 1 connected together in end to end aligned relation. Each trough 1 has a bottom wall 2 with generally upright side walls 3 of which the upper margins are bent outwardly to provide top external lateral flanges 4 along the entire length of the trough. Each trough 1 has external connecting flanges 5 at its opposite ends, respectively. Each flange 5 extends from the top of one flange 4 along the adjacent side wall 3, bottom wall 2, and opposite side wall 3 to the top thereof. Each flange 5 is planar and normal to the length of the troughs 1 so that the flange at the end of one trough can be placed in end to end face to face relation to the corresponding flange on the adjacent end of another trough. A suitable sealing gasket 6 is disposed between the flanges 5 and is clamped therebetween in sealing relation by suitable bolt and nut connections 7 including nuts 7a and bolts 7b extending through holes 8 in the flanges and holes 9 in the gasket.

The bolts 7b may have slotted hex heads for ease in installation by means of a wrench or a screw driver.

Each trough is provided with a cover 10 having a top wall 11 amd dependent flanges 12 at its lateral margins. The cover is connected to one side wall 3 by hinges 13 spaced along its length. The hinges 13 support the cover in a position such that it can be swung into open or, inoperative, position to a closed or, operative, position in which the underside of the top wall 11 is juxtaposed against the top of the flanges 4 in face to face relation. In this operative position the flanges 12 of the cover 10 extend downwardly beyond the flanges 4 of the troughs.

Each cover 10 terminates endwise close to, but in spaced relation to, the ends of its associated trough 1, thus leaving an open space between the adjacent ends of adjacent covers.

The joint sealing device of the present invention, indicated generally at 14, is disposed to close this open space. The device 14 comprises a top plate 15 and a bottom plate 16 securely fastened by bolts or rivets, as indicated at 17, in face to face relation. The top plate 15 is elongated and extends lengthwise across the troughs from outwardly adjacent the outer edge of one flange 4 to outwardly adjacent the outer edge of the other flange 4. The bottom plate 16 is shorter and wider than the top plate 15. The bottom plate is disposed relative to the ends of the top plate so that both ends of the top plate 15 extend beyond the corresponding end of the bottom plate and provide end margins 15a which overlie the flanges 4, respectively, when the device is in operative or closed position. The top plate is disposed relative to the lateral edges of the bottom plate 16 so that the lateral margins 16a of the bottom plate 16 extend outwardly transversely of the top plate beyond the opposite lateral limits of the top plate. The lateral margin 16a are wide enough to underlie the end portions of the top walls 11 of the adjacent covers 10.

In order to provide an effective seal at the joints, the faces of the margins 16a on the face of the plate 16 adjacent the plate 15, carry resilient sealing material, as indicated at 18, which is thick and of the open cell type so that it will not take a permanent set. The material overlies a substantial portion of the margins 16a for the full length of the bottom plate 16 and extends beyond the ends of the bottom plate 16 alongside the margins 15a of the top plate, so as to overlie the flanges 4, as indicated at 18a. The thickness of these end portions at 18a relative to the remainder of the sealing material is such that when the covers 10 are in closed position, the under surfaces of their top walls 11 are in firm sealing engagement throughout their entire width with the sealing material 18 on the margins 16a, and the bottom of the seal outwardly beyond the ends of the bottom plate 16 is in sealing engagement with the flanges 4 over an area extending from the outermost limit of the sealing material on one margin 16a to the outermost limit of the sealing material on the other maring 16a.

The midportion of the sealing material, beneath the end margins 15a of the plate 15, is held in firm sealing engagement with the flanges 4 by means of the plate 15 itself. The corner portions of the sealing material, disposed beyond the ends of the plate 16 and laterally beyond the edges of the plate 15, are held in firm juxtaposition with the flange 4 by the top wall 11 of the covers 10. Thus a seal is provided between the end portions of each cover and the flanges 4 at the top of the associated trough due to the extra thickness at 18a of sealing material between the covers 10 and the flanges 4. A seal is provided also between the adjacent ends of the adjacent covers 10 due to the sealing material 18 between the covers and the margins 16a of the imperforate plate 16, and between the device 14 itself and the flanges 4 due to the seal between the marginal portions 15a and the flanges 4.

For convenience, the sealing material may be a single sheet of elastomeric material which extends to the outermost lateral edge of the sealing material 18 at one edge of the plate 15 to the outermost edge of the sealing material 18 at the other edge of the plate 15. In order to provide the additional thickness of the sealing material at the ends of the bottom plate 16, additional strips of like material may be cemented to the underface of the sheet along its end margins between the plates 15 and 16.

It is desirable that the seal device be mounted for swinging upwardly to inoperative position and downwardly into operative position. For this purpose, one end margin of the plate 15 is provided with hinged elements 19 by which the plate 15 is hingedly connected to a hinge bracket 20. The hinge bracket 20 has one portion 20a which engages the outer edge or edges of one or both of the adjacent end flanges 5, and a portion 20b which, in the installed position with the portion 20a engaging the edge of a flange 5a, lies in face to face juxtaposition with one face of the engaged flange 5. The connecting poriton 20b has a hole 21 therein and one of the bolts 7 which connects the flanges 5 together in clamping relation with the gasket 6 passes through the hole 21 and clamps the bracket firmly in its installed position so that it supports the sealing joint device in place, as illustrated in the drawings, and so that the plates 15 and 16 with the sealing material thereon can swing upwardly to open or inoperative position, and downwardly to operative or sealing position.

It is apparent that when the seal is installed it provides a seal to exclude the introduction of moisture, oil and the like at the joint. Since the troughs are symmetrical and identical in cross section, they may be installed with either end toward the source. When the troughs are connected as herein disclosed, the resultant duct is a lay-in duct throughout its entire length, requiring no "fishing" of wires through the joints.

Having thus described our invention, we claim:

1. A lay-in duct for electric current carrying wires and comprising:
   a pair of like open top troughs connected together end to end in alignment with each other, and each having upper lateral marginal flanges at its top extending endwise of the troughs, and each of said marginal flanges having an upper face;
   covers for the troughs, respectively;
   said covers, in their closed position, having their adjacent ends spaced endwise of the troughs from each other and from said connected ends of the troughs, and each of said covers being of a width such that, in said closed position, its lateral margins overlap said lateral flanges of its associated trough;
   means for fastening the covers in closed positions on the troughs, respectively;
   a joint sealing device comprising a rigid body extending endwise transversely of the troughs across the open tops thereof at their connected end portions, and hingedly connected at one of its ends to at least one of said troughs for swinging upwardly to an open position and downwardly to a closed position, selectively;
   means on the other end of the body for detachably holding the body in closed position;
   said body including a top plate which, in the closed position of the body, extends endwise transversely of the troughs and, has end portions in overlapping relation to both lateral flanges of both troughs at, and adjacent, their connected ends, and a base plate of less length, transversely of the troughs, than the top plate and which, in said closed position, lies within the troughs and extends transversely of the troughs with an end near to the inner lateral limit of the flanges at one side of the troughs and the opposite end near to the inner lateral limit of the flanges at the other side of the troughs;
   said base plate being of greater width than the top plate and having lateral margins extending, in a direction endwise of the troughs, beyond the lateral limits of the top plate sufficient distances, respectively, to underlap adjacent end margins of said covers, respectively;
   sealing means carried by the body and positioned to lie in sealing relation between said upper faces of the trough flanges and said respective overlapping end portions of the top plate, between under faces of said adjacent end margins of the covers and upper faces of the underlapping lateral margins of the base plate for substantially the full length, in a direction transversely of the troughs, of said base plate, and directly between the faces of the lateral flanges of the troughs and the faces of those portions of said end margins of the covers overlapping said lateral flanges;
   wherein the sealing means includes a single piece of resilient sealing material clamped between the plates and which overlies said base plate at its said lateral margins for their full length transversely of the troughs and endwise of the base plate beyond said end portions of the base plate at and between said lateral margins of the base plate so as to underlie said end margins of the top plate near its ends for the full width of the top plate; and
   connecting means securely fasten the plates to each other in said clamping relation to the said piece of material.

2. A duct as claimed in claim 1 wherein each wall of each of the adjacent ends of the pair of troughs has an external peripheral connecting end flange extending radially outwardly from the trough and facing outwardly endwise of the trough;
   said flanges are connected in fixed face to face alignment with each other;
   securing means secure the flanges together;

said joint sealing device includes a hinge bracket having a hinge portion connected to said body and a connecting portion juxtaposed in face to face relation to at least one of said external peripheral flanges and supporting the hinge portion with its hinge axis extending endwise of the troughs; and said securing means secure said connecting portion to at least one of the peripheral flanges.

3. A duct as claimed in claim 2 wherein said securing means includes a bolt extending through said end flanges;

said supporting portion of the bracket has an aperture therein; and said bolt extends through said aperture and, when in position for securing the flanges in connected relation, secures said connecting portion of the bracket to said flanges.

4. A duct as claimed in claim 3 wherein the supporting portion of the bracket is of L-shaped cross section, and the leg of the L is juxtaposed against the face of said one of the flanges and the base of the L is juxtaposed against the edges of the flanges when the connecting portion is connected to said one of the flanges.

5. A joint sealing device for the purposes described and comprising:

a top plate;

a base plate;

said top plate being elongated;

said base plate being of lesser length than the top plate, and of greater width through its length, than the top plate;

means securing the plates in a fixed position relative to each other such that the base plate has lateral marginal portions coextensive with its length and extending outwardly laterally beyond the lateral edges of the top plate, respectively, and such that the top plate has end marginal portions extending outwardly beyond the ends, respectively, of the base plate;

sealing means on the upper face of the base plate and having lateral margins overlying said lateral marginal portions, respectively, of the base plate for the full length of said lateral marginal portions and said lateral margins of the sealing means having end marginal portions extending endwise of the base plate beyond the opposite ends of the base plate, respectively, at said lateral margins thereof and so as to be exposed at its top and bottom faces; and other portions of said overhanging marginal portions of the sealing means underlying the end marginal portions of the top plate, respectively.

6. A joint sealing device as claimed in claim 5 wherein said end marginal portions of the sealing means extend continuously from the outermost lateral limit of one of said lateral marginal portions of the sealing means to the outermost lateral limit of the other one of said lateral marginal portions of the sealing means.

7. A joint sealing device as claimed in claim 5 wherein said end marginal portions of the sealing means are thicker than the portions of the sealing means overlying the lateral marginal portions of the base plate.

8. A joint sealing device as claimed in claim 5 wherein the sealing means includes a single sheet of material which underlies the entire under face of the top plate and extends outwardly laterally thereof beyond the lateral edges of the top plate and extends for the full length of the top plate, and which overlies said lateral marginal portions of the base plate and extends beyond the ends of the said marginal portions.

* * * * *